United States Patent Office 3,445,880
Patented May 27, 1969

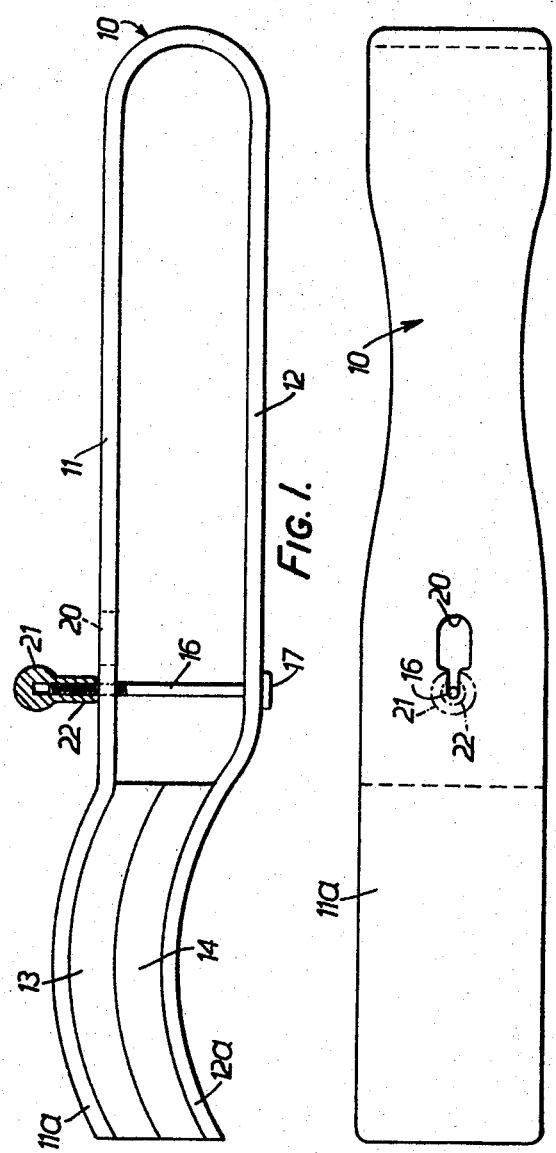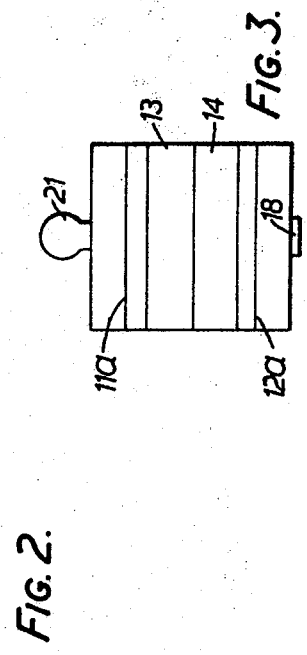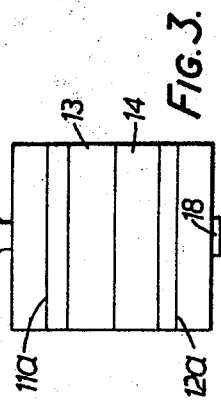

3,445,880
BLIND CLEANING APPLIANCE
Arthur Richard Warner, 23 The Vale, Chelsea,
London SW. 3, England
Filed May 10, 1967, Ser. No. 637,405
Int. Cl. A47l 17/00
U.S. Cl. 15—210                 9 Claims

ABSTRACT OF THE DISCLOSURE

A Venetian blind cleaning tool comprises a U-shaped unitary member of which the ends carry cleaning members shaped to fit the slats and are resiliently biased away from each other. A releasable catch is provided to retain the cleaning elements in contact with the blind slat when in use.

---

This invention relates to cleaning appliances, and has for its object to provide an appliance particularly suited to the cleaning of the slats of Venetian blinds.

An embodiment of the invention may comprise a manually operable appliance for cleaning a blind slat, comprising the combination of conjoined mutually outwardly biased support members having opposed faces, one of said support members having an aperture therein; cleaning elements on said opposed faces of said support members, said support members being manually movable against said bias to a relative position in which said cleaning elements are positioned to engage opposed faces of said slat; a latch member having a catch portion, said latch member extending from the other said support member to pass through said aperture, said catch portion engaging said one support member in said relative position of said support members to resist said outward bias.

In one form of the invention, described in more detail hereinafter, an appliance for this purpose comprises two arms associated with a common handle, the arms being sprung outwardly away from each other and having on their inner surfaces near the free ends, cleaning elements, for example, pads, brushes or sponges to engage the opposite surfaces of a slat. The arms can be brought together by manual pressure, and a catch, readily releasable, is provided to hold the arms in position with the pads engaging the surface of a slat. The slat can be cleaned by applying the pads to its surfaces, holding them in position by the catch, and then moving the appliance along the length of the slat. Finally, with the pads still engaging the slat, the appliance is removed from the slat by drawing it back and away from the slat. The catch is then released to separate the pads, so that the next slat can be inserted and cleaned in the same way.

Figure 4:
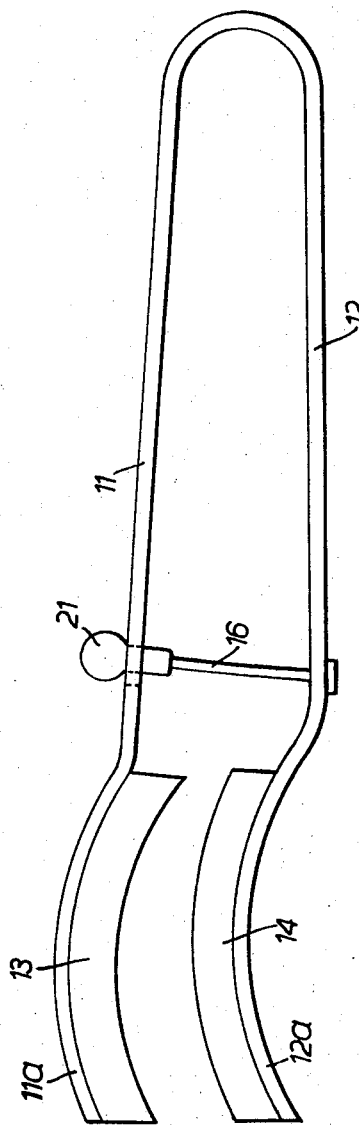
Figure 5:
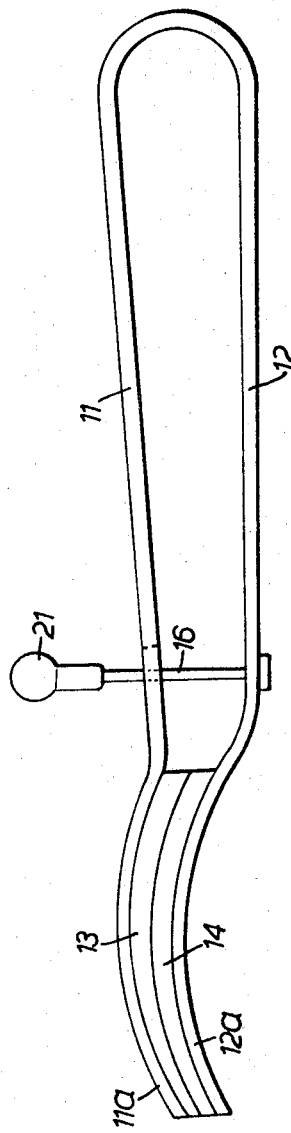
Figure 6:
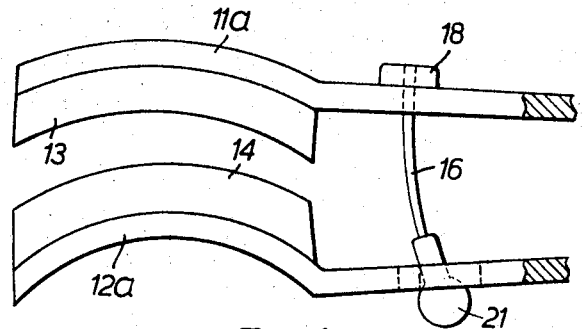
Figure 7:
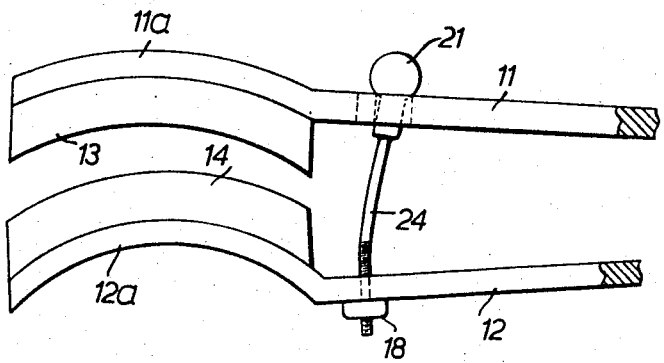
Figure 8:
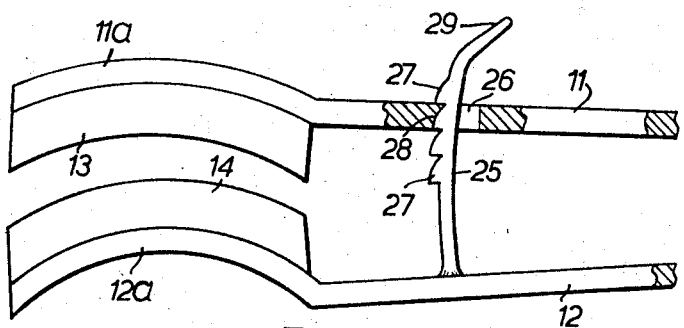

Other features and advantages of the invention will appear from the following description of one embodiment thereof, given by way of example, in conjunction with the drawings accompanying the provisional specification, in which:

FIGURE 1 is a side elevation of an appliance for cleaning a blind slat;
FIGURE 2 is a plan view of the device of FIGURE 1;
FIGURE 3 is an end elevation of the same device;
FIGURE 4 is a fragmentary view of the same device with the arms in the initial position;
FIGURE 5 is a fragmentary view showing the arms in a position to squeeze excess liquid from the pads;
FIGURE 6 is a fragmentary view of an embodiment of blind slat cleaning device according to the invention in which the catch is inverted as compared with that shown in FIGURES 1, 2, 4 and 5;
FIGURE 7 is a fragmentary view of an embodiment of cleaning device according to the invention employing a modified form of catch; and
FIGURE 8 is a fragmentary view of an embodiment of cleaning device according to the invention employing an alternative form of catch.

The appliance shown comprises a one-piece, U-shaped member 10 made of a suitable resilient material such as a plastics material presenting two arms 11 and 12. At their joined ends the arms together provide a suitable handle for the device, as shown in FIGURES 1 and 2. At their other ends, the arms 11 and 12 are curved as at 11a and 12a, the curves being shaped in the same direction and corresponding approximately to the cross-sectional shape of the slat of a Venetian blind. On the inner surfaces of the curved portions 11a and 12a are secured cleaning elements 13, 14 such as brushes or pads of cloth or of a material such as synthetic sponge.

The member 10 is made so that the arm 11 and 12 will, by the resiliency of the material, normally assume the position shown in FIGURE 4 but can be pressed inwardly, when held in the hand into the position shown in FIGURE 1. In this position the surfaces of the pads 13 and 14 are in contact, and a catch is provided to hold them in this position. This comprises a spring wire 16 which at its one end is attached to arm 12, as by moulding the wire into the plastic. To provide a secure anchorage the wire may be knurled and additional security may be provided by the addition of an integrally moulded boss 17. The wire 16 passes through an opening 20 in the upper arm 11, and has screwed upon it a knob in the form of a stemmed ball 21. As shown in FIGURE 2, in which knob 21 is shown in broken line for clarity in illustration, the opening 20 is key-hole shaped and wire 16 biases the knob forwardly to the position shown, in which the lower end of ball stem 22 rests against the outer surface of arm 11, to provide the desired catch. The catch can be released by pulling the ball backwardly, allowing the stem portion of knob 21 to drop into the larger part of the opening 20, as shown in FIGURE 4, and thus permitting pads 13 and 14 to separate to an extent limited by the inability of ball 21 to pass through opening 20.

Moreover, the pressure exerted between the pads when the catch is in position can be adjusted as desired by screw adjustment of knob 21 upon wire 16. This adjustment, which effectively shortens the length of the wire 16, controls the pressure with which the pads engage a slat when in use, and allows adjustment to be made for wear of the pads.

In use, the pads are moistened and excess liquid can be squeezed out by pressing the pads together as shown in FIGURE 5. The pads are separated, as shown in FIGURE 4, and the slat is inserted between them. The arms are squeezed together, whereupon they are held by the catch, and the slat can then be wiped clean. The appliance can then be withdrawn from the slat, and to release the arms it is necessary merely to pull knob 21 backwardly.

It is obviously possible to invert the catch shown in FIGURE 1, forming hole 20 in lower arm 12 while mounting spring wire 16 in upper arm 11, as shown in FIGURE 6.

In a modified arrangement shown in FIGURE 7, spring wire 16 is replaced by a rod 24 of nylon or like plastics material, the lower end of which is screw-threaded to cooperate with a screw thread formed in an enlargement 18 of arm 12.

In the modified embodiment of the invention shown in FIGURE 8, spring wire or rod 16 is replaced by a ratchet member 25 either secured to or more conveniently moulded integrally with one of the arms 11, 12. The drawing shows member 25 as integral with lower arm 12 and as passing through a slot 26 formed in upper arm 11. Ratchet member 25 is provided with projecting ratchet teeth 27 which engage the surface of a tooth 28, formed in the margin of slat 26 in upper arm 11 in the case of the illustrated embodiment. The disposition and form of ratchet member 25 is such that the teeth projecting therefrom are resiliently biased against tooth 28 on arm 11. Thus when arms 11, 12 are moved towards each other they will be retained in their abutting position by the ratchet catch. The catch may be released to disengage the cleaner from a slat by manual pressure on the upper end 29 of member 25 which may be formed as shown or otherwise as convenient and to limit inadvertent separation of arms 11 and 12. Ratchet member 25 is conveniently of generally rectangular section.

I claim:
1. In a manually applicable appliance for cleaning a blind slat, the combination of:
  a unitary member bent to form mutually outwardly biased support portions having opposed faces, one of said support portions having an aperture therein;
  cleaning elements on said opposed faces of said support portions, said support portions being manually movable against said bias to a predetermined relative position in which said cleaning elements are positioned to engage opposed surfaces of the slat to be cleaned;
  a latch member extending from the other of said support portions to pass through said aperture, said latch member including a catch portion engaging said one support portion in said predetermined relative position of said support portions to resist said outward bias and further including adjustment means for varying the position of said catch portion relative to said other support portion thereby to vary said relative position of said cleaning elements.

2. The invention claimed in claim 1 wherein said other support portion has a screw-threaded aperture and said adjusting means comprises a screw-threaded member engaged in said aperture.

3. The invention claimed in claim 1 wherein said latch member is a resilient rod having a stemmed ball at one end and wherein said aperture in said one support member is of key-hole shape, having a wider portion permitting the passage of said stem but not of said ball and a narrower portion preventing the passage of said stem.

4. The invention claimed in claim 1 wherein said latch member is provided with a plurality of ratchet teeth selectively engageable with the periphery of said aperture in said one support member.

5. The invention claimed in claim 1 wherein said latch member is resiliently biased laterally of its length into said engagement with the periphery of said aperture in said one support portion member.

6. The invention claimed in claim 1 for cleaning a transversely curved blind slat wherein said cleaning elements present to one another mating curved surfaces having the curvature of said blind slat.

7. A manually applicable cleaning device for a blind slat comprising in combination:
  a generally U-shaped unitary member of resilient material, the branches of said member having spaced opposed surfaces conforming to opposed surfaces of said slat;
  cleaning elements on said opposed surfaces;
  one of the branches of said U-shaped member having an aperture therein;
  a resilient latch member having a catch portion, said latch member being secured to the other one of said branches for resiliently biased engagement with the periphery of said aperture whereby on deformation of the branches of said U-shaped member toward each other to juxtapose said cleaning elements said catch portion engages said aperture periphery to retain said surfaces juxtaposed.

8. The invention claimed in claim 1 wherein said latch member is a resilient rod fixedly mounted in said other support member, and having a screw-threaded end extending through said aperture, and wherein said catch portion is an internally screw-threaded stemmed ball screwed upon said rod to provide said screw adjusting means.

9. The invention of claim 7 wherein said latch member is a resilient wire having a screw-threaded end portion, wherein said catch portion is a knob having a ball portion and a stem portion screwed upon said wire and wherein said wire passes through an aperture in said limb of which one portion permits the passage of said stem portion of said knob and another portion does not permit the passage of said stem portion.

References Cited

UNITED STATES PATENTS

| | | | |
|---|---|---|---|
| 2,819,484 | 1/1958 | Fouse | 15—210.1 X |
| 3,075,223 | 1/1963 | Warner | 15—210.1 |
| 3,137,880 | 6/1964 | Kubit et al. | 15—244 |

FOREIGN PATENTS

| | | |
|---|---|---|
| 46,740 | 7/1929 | Norway. |
| 588,164 | 1/1925 | France. |

WALTER A. SCHEEL, *Primary Examiner*

L. G. MACHLIN, *Assistant Examiner.*